United States Patent
Pfeil et al.

(10) Patent No.: US 9,290,124 B2
(45) Date of Patent: Mar. 22, 2016

(54) LIGHTING DEVICE, IN PARTICULAR CONTOUR LIGHTING FOR A MOTOR VEHICLE

(71) Applicant: Audi AG, Ingolstadt (DE)

(72) Inventors: Marcus Pfeil, Feucht (DE); Peter Wehrlin, Neckarsulm (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/383,039

(22) PCT Filed: Mar. 14, 2013

(86) PCT No.: PCT/EP2013/000772
§ 371 (c)(1),
(2) Date: Sep. 4, 2014

(87) PCT Pub. No.: WO2013/135387
PCT Pub. Date: Sep. 19, 2013

(65) Prior Publication Data
US 2015/0298604 A1    Oct. 22, 2015

(30) Foreign Application Priority Data
Mar. 16, 2012    (DE) .................. 10 2012 005 397

(51) Int. Cl.
*B60Q 3/02*    (2006.01)
*B60Q 3/00*    (2006.01)

(52) U.S. Cl.
CPC ............. *B60Q 3/0289* (2013.01); *B60Q 3/004* (2013.01)

(58) Field of Classification Search
USPC ............ 362/511, 487, 565, 559, 582, 311.13, 362/311.14, 311.15
See application file for complete search history.

(56) References Cited

U.S. PATENT DOCUMENTS

| | | | | |
|---|---|---|---|---|
| 4,788,630 A | * | 11/1988 | Gavagan | B60Q 3/0216 362/501 |
| 5,813,148 A | | 9/1998 | Guerra | |
| 6,250,785 B1 | * | 6/2001 | Mallia | B60Q 1/323 362/495 |
| 8,215,810 B2 | * | 7/2012 | Welch, Sr. | B60Q 3/004 362/488 |
| 2002/0121154 A1 | | 9/2002 | Yamazaki et al. | |
| 2003/0026105 A1 | | 2/2003 | Becher et al. | |
| 2003/0214804 A1 | | 11/2003 | Irie | |
| 2008/0259620 A1 | * | 10/2008 | Oba | F21S 48/2237 362/487 |
| 2013/0094233 A1 | * | 4/2013 | Ukai | B60Q 3/004 362/511 |
| 2014/0036522 A1 | * | 2/2014 | Nakada | F21S 48/00 362/511 |
| 2014/0078765 A1 | * | 3/2014 | Bungenstock | F21S 48/215 362/511 |
| 2014/0226353 A1 | * | 8/2014 | Sohizad | G02B 6/001 362/511 |

FOREIGN PATENT DOCUMENTS

| | | |
|---|---|---|
| DE | FR 297 17 698 | 1/1998 |
| DE | 199 21 968 | 11/2000 |

(Continued)

OTHER PUBLICATIONS

International Search Report issued by the European Patent Office in International Application PCT/EP2013/000775 on Jun. 19, 2013.

*Primary Examiner* — Laura Tso
(74) *Attorney, Agent, or Firm* — Henry M. Feiereisen, LLC

(57) ABSTRACT

A lighting device, in particular contour lighting for a motor vehicle, includes a housing made from a plastic material that is transparent to the light coupled into the housing and functions as a diffuser and is covered with a coating at least in the region of the outer surface thereof that is visible when mounted and that is not transparent to the light coupled in, wherein the coating is removed locally in order to form a narrow light-emitting line.

14 Claims, 3 Drawing Sheets

(56) References Cited

FOREIGN PATENT DOCUMENTS

| DE | 100 26 385 | 11/2001 |
| DE | 101 34 641 | 5/2003 |
| DE | 10 2008 017 345 A1 | 11/2008 |
| DE | 202008008877 | 4/2009 |
| DE | 202010005663 | 11/2010 |
| DE | 102009027792 | 1/2011 |

* cited by examiner

LIGHTING DEVICE, IN PARTICULAR CONTOUR LIGHTING FOR A MOTOR VEHICLE

CROSS-REFERENCES TO RELATED APPLICATIONS

This application is the U.S. National Stage of International Application No. PCT/EP2013/000772, filed Mar. 14, 2013, which designated the United States and has been published as International Publication No. WO 2013/135387 and which claims the priority of German Patent Application, Serial No. 10 2012 005 397.5, filed Mar. 16, 2012, pursuant to 35 U.S.C. 119(a)-(d).

BACKGROUND OF THE INVENTION

The invention relates to a lighting device, in particular contour lighting for a motor vehicle.

Lighting devices in different types and shapes are known in the art. They are used for both room lighting, but sometimes also for visualization or emphasizing certain items or objects. Such lighting devices are often referred to as contour lighting since they visually highlight the shape or contour of an object to be emphasized. Such contour lighting is used in equipment or machinery, as well as for example also in a motor vehicle, where contour lighting finds particular application, for example, for loudspeakers, buttons and panels, cup holders, etc. These lighting devices are ultimately luminous strips to highlight or emphasize certain contours. Such contour lighting, i.e. strip lighting, is typically realized by using a light guide, which runs along the contour to be highlighted. This light guide can either be viewed directly or installed behind a diffuser mounted in front. Light is coupled into the light guide at an end face, the light exits along the side of the light guide, so that ultimately a linear light strip is visible.

In order not to adversely affect the properties of such a light-conducting element such as an light guide, such an element requires a minimum cross-sectional area of about 7 $mm^2$, wherein a height/width or a diameter should not be less than 2.5 mm. For diffusers, the limiting parameters are the manufacturing and integration in the available space. Today's well-known contour lighting have for this reason a considerable width, i.e. the bright light strip is relatively wide, typically about 2.5 mm or more. However, such a broad light strip is not desirable in some cases, be it for aesthetic reasons, because for example the component to be emphasized is relatively small and such a wide light strip would be quasi oversized, or for structural reasons, because such a wide light stripe can sometimes not always can be integrated.

SUMMARY OF THE INVENTION

The invention is therefore based on the problem to provide a lighting device, in particular in the form of contour lighting for a motor vehicle, with which a very narrow light strip can be formed.

To solve this problem, a lighting device, in particular a contour lighting for a motor vehicle, is provided by the invention which is characterized by a housing made of a plastic material that is transparent for the light to be coupled into the housing, wherein the housing acts as a diffuser and is covered at least in the region of its outer side that is visible in the installation position with a non-transparent coating for the coupled light, that is locally removed to form a narrow light-emitting line.

The housing of the lighting device according to the invention, which preferably serves as a contour lighting, is an elongated component, whereas the housing itself is made of a plastic material transparent for the light. Its basic shape ultimately corresponds to the shape of the component that should be emphasized by the contour illumination. Optionally, fastening means such as locking elements and the like are provided on the housing itself so as to be able to attach it on the component to be illuminated.

Since the housing is made of a plastic material transparent to the coupled light, light can be coupled into the housing and out of the housing. This is done with a light guide associated with the housing. The light guide radiates light to the side, wherein this light is coupled into the housing. Since the housing is only partially visible after installation, a coating that is non-transparent for the coupled light is applied at least in this area, for example paint or a metallic layer to impart a metallic look, or a non-transparent plastic coating and the like. To now be able to realize a very thin light emission line, this non-transparent layer is locally removed, which can be done for example by mechanical removal or by laser ablation. In addition, a very thin line be exposed on the housing, i.e. the coating material can be removed, so that light that is coupled in can exit through a very thin line or can be visible as a very thin line of light. This makes it possible to readily produce a very narrow light strip, for example, to highlight the contour of relatively small components or, if desired, just to realize very narrow contour lighting. The term "local removal" according to the invention should also be understood as applying the coating in the areas to be covered and is not already deposited already during the application in the narrow region forming the light strip. This can be readily accomplished by appropriate masking when the coating is applied, but also by a corresponding structure of the housing, as will be discussed below.

The light-emitting line, which is the region in which the coating has been removed, should have a width of <1 mm, in particular between 0.3-0.5 mm. This is readily possible, when the coating is removed either mechanically or with a laser, as described above.

In a particularly advantageous embodiment of the invention, the housing has a receptacle for a light guide which emits the light to be dispensed through the light-emitting line into the housing. I.e., the light guide is placed directly in or on the housing itself, and therefore emits light directly into the plastic housing. The receptacle, which can readily be introduced into the housing, which is preferably a simple injection-molded plastic component, has a cross-sectional shape matching the cross-sectional shape of the light guide, so that the light guide can be attached on the housing in a simple manner, for example by an interference fit, i.e. a kind of positive form locking.

As an alternative approach to using a separate light guide attached on the housing side, the housing itself may be used as a light guide. In this case, light is coupled via a suitable light source at a housing end face. By suitably structuring the backside of the housing, the light guided in the housing can also be coupled out to the side, i.e. in the exposed area on the coating side.

The coating itself is preferably a lacquer, but may also be a vapor-deposited layer or an electrodeposited layer. Since this coating is visible, the coating material may be selected depending on the desired visual appearance. When a metal coating is applied, the lighting device is ultimately provided with a metallic optics; when a lacquer is applied, it may be designed to have the same color as the component to be illuminated.

The housing itself may be made of a plastic material, for example PMMA or PC, as long as it is sufficiently transparent. The coating itself may be a lacquer that can be applied to almost any suitable plastic material, in particular PMMA or PC. Conversely, a metal layer, in particular a chromium layer, cannot be applied to all possible plastic materials, in particular not PMMA or PC. To make this still possible, in particular for PMMA and PV, the housing is manufactured according to the invention of two different, but sufficiently transparent plastic materials which can preferably be simultaneously processed in a 2-component process. Onto the actual first plastic material forming the housing main body, for example PMMA or PC, a likewise sufficiently transparent layer of a second plastic material for example ABS is applied, which serves as a support for the galvanically applied metal layer or—if necessary—a multilayer structure (e.g., a layer structure of Ni—Cu—Cr). The metal layer or the layer structure is then either applied over a large area and thereafter locally removed mechanically or with a laser to form the light-emitting line, or the metal layer or the layer structure is deposited already by masking the light-emitting line.

It is conceivable to apply the second plastic layer already so that a narrow strip of the first plastic-material forming the light emission line, i.e. for example the PMA or PC, remains unobstructed, i.e. is not covered with the second plastic material such as ABS. When the metal layer (structure) is electrodeposited onto the second plastic layer, it does not adhere to the exposed PMMA or PC, so that the light-emitting line remains automatically unobstructed.

In addition to the lighting device itself, the invention also relates to a motor vehicle that includes at least one lighting device of the aforedescribed type.

BRIEF DESCRIPTION OF THE DRAWING

Further advantages, features and details of the invention will become apparent from the embodiments set forth below and with reference to the drawings.

DETAILED DESCRIPTION OF PREFERRED EMBODIMENTS.

Figure 1:
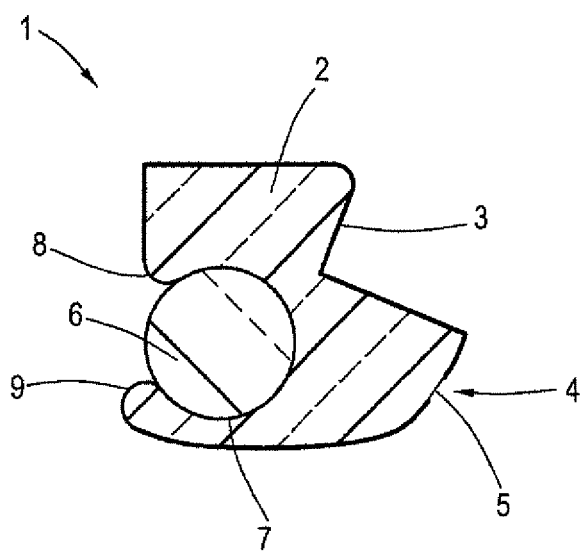
FIG. 1 is a schematic diagram of a first embodiment of a lighting device according to the invention in cross-section.

FIG. 1 shows a lighting device 1 according to the invention with a housing 2 made of a plastic material that is transparent to the light coupled into the housing, for example PMMA. The housing is elongated, with FIG. 1 showing only a sectional view. Its basic form ultimately corresponds to the shape of the component and the contour, respectively, to be illuminated.

The cross section shown in FIG. 1 is merely exemplary. Naturally, the housing has a cross-sectional shape which allows it to be attached or integrated where it is to be installed, for example, in or on a motor vehicle. In other words, the diagram is by no means exhaustive. Of course, it would also be possible to form on the housing corresponding latching or clamping elements and the like, as is indicated, for example, by the step.

The housing 2 itself is in the illustrated example provided over its almost entire area with a coating 3, for example a lacquer, a vapor-deposited layer or an electrodeposited layer. This layer is not transparent to light coupled into the housing 2. The coating is removed only in the region 4, thus forming in that region, i.e. on the visible side, a light emission line 5 from which the light coupled into the housing can exit.

In the illustrated embodiment, the light is coupled into the housing 2 by way of a light guide 6. The light guide 6 is received directly in the housing 2. For this purpose, a receptacle 7 having in the illustrated example a substantially round cross-section is formed in the housing 2, in which the light guide 6 which also has a round cross-section is inserted. This can be readily accomplished with a slight press fit in which, as shown, a slight double-sided undercut is realized, namely by way of the two shoulders 8, 9.

When light is now coupled into the light guide 6 from a front side, the light passes through the light guide 6 Due to the structure of the light guide, the light is not only guided longitudinally, but is also coupled out laterally and is thus inherently coupled into the housing 2. From there, the light can exit to the outside only through the light-emitting line 5, and is thus visible in form of a thin line of light forming the contour illumination.

Figure 2:
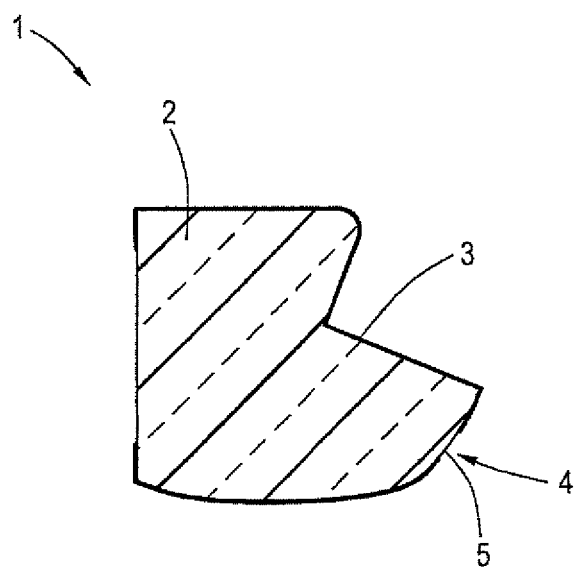
FIG. 2 is a schematic diagram of a second embodiment of a lighting device according to the invention in cross-section.

FIG. 2 shows another embodiment of a lighting device 1 according to the invention, which once more includes a housing 2 which is, however, here not used to receive a light guide, but ultimately itself acts as a light guide or diffuser, respectively. While its cross-sectional shape corresponds to the diagram of FIG. 1, no separate receptacle for the light guide is formed in this case. The light is directly coupled in at an end face of the housing which, as mentioned before, itself forms the light guide and propagates along the housing. Due to a pattern (not shown in detail) disposed at least on the left side housing surface, the light guided in the housing 2 is reflected into the volume and therefore also to the side. Because the exterior side of the housing is here also almost completely covered with a coating 3, which in turn is removed only in the region 4 mechanically or, for example, with a laser so as to form a thin light-emitting line 5, the scattered light again exits only from this thin light-emitting line 5, i.e. is visible as a very thin line.

The width of the light-emitting line 5 is in the preferred range between 0,3-0,5 mm. The housing itself is preferably made of PMMA, but may another plastic may also be used as long as it is sufficiently transparent for the light guided in the plastic.

Similarly, a colored plastic material may also be used, when colored light emission should take place to form the contour light.

Figure 3:
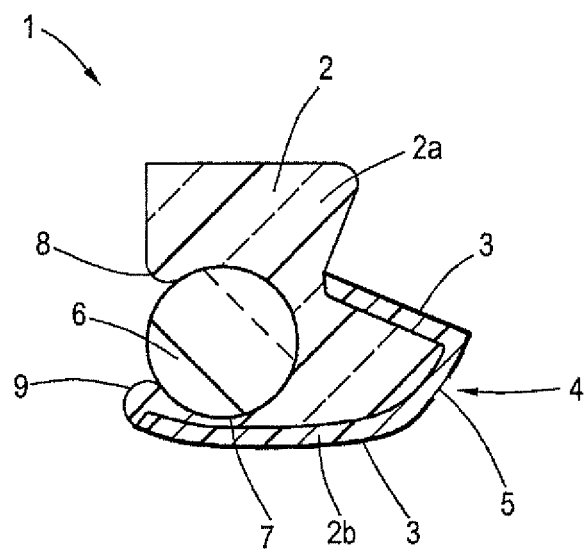
FIG. 3 is a schematic diagram of a third embodiment of an lighting device according to the invention in cross-section with a housing made of two different plastic materials.

FIG. 3 shows another embodiment of a lighting device wherein the housing 2 is composed of two different plastic materials 2a and 2b. The plastic material 2a, for example PMMA or PC, forms the main body of the housing. In a 2-component process, the plastic material 2b, e.g. ABS, which is also a transparent or at least translucent material is applied on the outside on the first plastic material 2a. It serves as a support for a coating 3 to be applied in form of a galvanically applied or vapor-deposited metal layer or metallic multi-layer structure, such as a Cr layer or a multilayer structure composed of Ni—Cu—Cr. The coating 3 is in this case also locally removed, for example mechanically or with a laser, to form the light-emitting line 5. In other words, the second plastic material is exposed in the region 4. Alternatively, the coating 3 may also be deposited only locally, i.e. the region 4 is already formed during deposition and the second plastic material is not coated.

Figure 4:
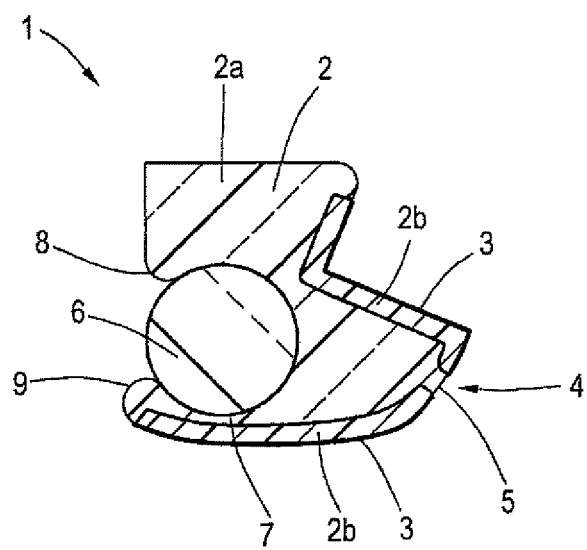
FIG. 4 is a schematic diagram of a fourth embodiment of a lighting device according to the invention in cross-section with a housing made of two different plastic materials.

FIG. 4 shows an embodiment similar to the embodiment of FIG. 3, but in this embodiment the second plastic material 2b is not applied over a large area, but only locally on the first plastic material 2. The second plastic material 2b is thus unobstructed in the region 4 and hence itself forms the light-emitting line 5. The coating 3 is electrodeposited or evaporated in the form of a metal layer or metal layer structure onto the second plastic material 2b, wherein the coating 3 is deposited only on the second plastic material 2b, i.e. the ABS, while the metallic coating is not deposited on or does not adhere to the first plastic material 2a.

Figure 5:
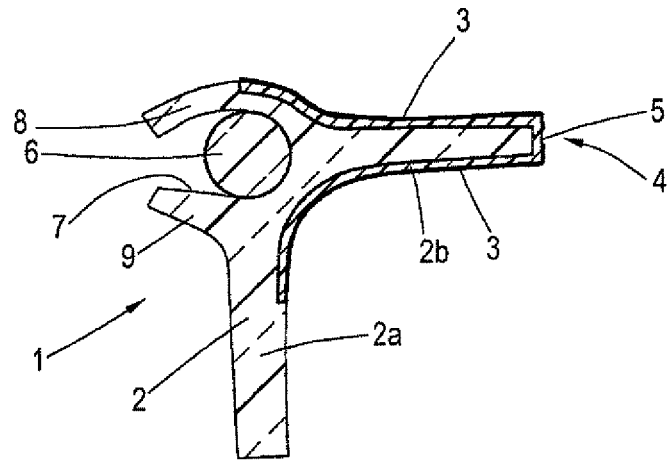
FIGS. 5 to 7 are schematic diagrams of other inventive lighting devices of different geometry in cross-section with a housing made of two different plastic materials.
Figure 6:
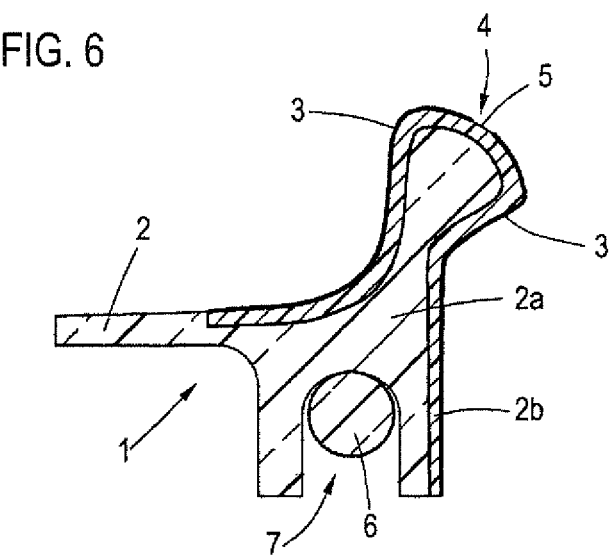
Figure 7:
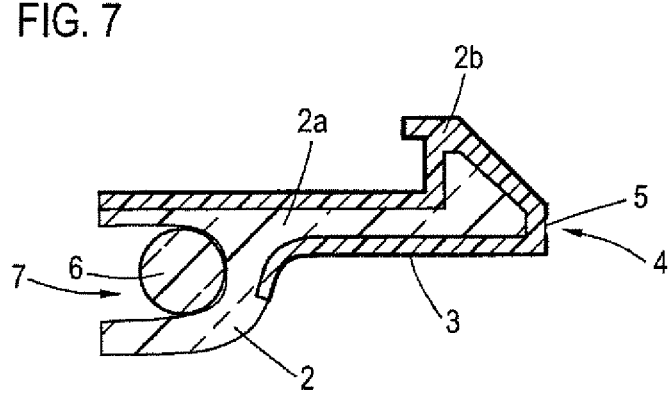

FIGS. 5 to 7 show additional embodiments of lighting devices with different geometry, wherein the respective housing 2 also composed of two plastic materials 2a and 2b. The second plastic material is, like the embodiment of FIG. 3, applied over a large area as support for the metallic coating. The coating 3 is locally removed to form an exposed region that forms the light-emitting line 5, or is deposited only locally by masking the region 4.

The basic structure with respect to the round receptacle 7 which may optionally be metalized and in which the light guide 6 is received, is also common to the embodiments of FIGS. 3 to 7. The plastics material(s) may optionally also be colored. It will be understood that other sufficiently transparent plastic materials can be used instead of the described materials (PMMA or PC and ABS).

The invention claimed is:

1. A lighting device, comprising:
  a housing constructed of a first plastic material forming the housing main body and made of a plastic material which acts as a diffuser and a second plastic material covering at least partially an outer surface of the first plastic material, wherein the housing is translucent to light coupled into the housing, and
  a coating that is a opaque for the light coupled in and is disposed on an outer side of the second plastic material at least in a region that is visible in an installed position of the housing, wherein a portion of the coating is locally removed so as to form a narrow light-emitting line.

2. The lighting device of claim 1, constructed as contour lighting for a motor vehicle.

3. The lighting device of claim 1, wherein the light-emitting line has a width of less than 1 mm.

4. The lighting device of claim 1, wherein the light-emitting line has a width between 0.3-0.5 mm.

5. The lighting device of claim 1, wherein the housing comprises a receptacle for receiving a light guide which emits the light emitted by the light-emitting line into the housing.

6. The lighting device of claim 1, wherein the housing operates as a light guide.

7. The lighting device of claim 1, wherein the second plastic material is applied to the outer surface of the first plastic material so as to form a one-piece material surface area.

8. The lighting device of claim 1, wherein the second plastic material is applied such that the first plastic material is exposed in a region of the light-emitting line and is not coated in this region.

9. The lighting device of claim 1, wherein the first and the second plastic material is PMMA or PC.

10. The lighting device of claim 1, wherein the first plastic material is PMMA or PC and the second plastic material is ABS.

11. The lighting device of claim 1, wherein the coating is a lacquer, a vapor-deposited layer or an electrodeposited layer.

12. The lighting device of claim 1, wherein the coating is locally removed mechanically or with a laser.

13. The lighting device of claim 1, wherein the first plastic material is colored.

14. A motor vehicle, comprising at least one lighting device having a housing constructed of a first plastic material forming the housing main body and made of a plastic material which acts as a diffuser and a second plastic material covering at least partially an outer surface of the first plastic material, wherein the housing is translucent to light coupled into the housing, and a coating that is a opaque for the light coupled in and is disposed on an outer side of the second plastic material at least in a region that is visible in an installed position of the housing, wherein a portion of the coating is locally removed so as to form a narrow light-emitting line.

* * * * *